United States Patent [19]

Fritz

[11] Patent Number: 4,475,642
[45] Date of Patent: Oct. 9, 1984

[54] SYSTEM FOR MANUFACTURING AND MOUNTING

[76] Inventor: Hans-Ulrich Fritz, Am Wolfsberg 10, D-7000 Stuttgart 70, Fed. Rep. of Germany

[21] Appl. No.: 363,563

[22] Filed: Mar. 30, 1982

[30] Foreign Application Priority Data

Mar. 31, 1981 [DE] Fed. Rep. of Germany ....... 3112911

[51] Int. Cl.³ ............................................. B65G 21/20
[52] U.S. Cl. ..................................... 198/345; 198/472
[58] Field of Search ................... 104/88; 198/472, 345, 198/580, 341

[56] References Cited

U.S. PATENT DOCUMENTS

| 2,717,699 | 9/1955 | Spindler et al. | |
|---|---|---|---|
| 3,951,605 | 4/1976 | Natelsen | 198/341 X |
| 4,014,428 | 3/1977 | Ossbahr | 198/472 X |
| 4,291,797 | 9/1981 | Ewertowski | 198/349 X |
| 4,371,075 | 2/1983 | Erlichman | 198/472 X |

FOREIGN PATENT DOCUMENTS

WO80/00690 4/1980 PCT Int'l Appl. .................. 104/88

Primary Examiner—Jeffrey V. Nase
Attorney, Agent, or Firm—Steele, Gould & Fried

[57] ABSTRACT

A system comprises individual units (11, 12, 13, 14, 15, 16) with independent conveying means, which convey work carriers (19) on which are arranged a plurality of workpieces (53). The units do not have mechanical drive connections and can be freely connected or combined with one another. On their sides, the work carriers (19) have teeth, in which engage the pinions on the units. On some of the units, these pinions have a freewheel, so that the relatively long work carrier from the previous unit can engage wtih the following pinion, without the drive already running, or without overrunning the same. The assembly system has buffer units (12) for the intermediate storage or work carriers, conveying units (14) for rectilinear conveying, pivoting units (15) for pivoting the work carriers (19) into a different running direction, as well as work carrier units (13, 16), working without or with indexing and provided for assembly and machining by automatic machine tools or assembly machines or manually.

28 Claims, 19 Drawing Figures

SYSTEM FOR MANUFACTURING AND MOUNTING

PRODUCTION OR ASSEMBLY SYSTEM

The invention relates to a production or assembly system with conveying means, which convey through the individual stations of the system the work carriers for workpieces to be placed thereon by means of drive members acting on said carriers.

The company journal "BOSCH-AKTUELL" No. 7 of September 1980 describes an assembly system, in which the work carriers are conveyed through the individual assembly stations by means of a double belt assembly line, on which they rest and are driven by friction. They are stopped by stop members in the assembly stations. Both the line and the work carriers are exposed to wear and the system has little flexibility, because it is not possible without difficulty to interpose assembly stations or extend the line, without replacing the complete line.

In addition, the article "Automatische Montagesysteme mit integrierten Störungspuffern" by Dr. H. G. Löhr, Bad Liebenzell, p.38, FIG. 11 discloses a system in which the work carriers are driven by friction rollers driven and optionally disengageable in unitary manner. Although this system has greater flexibility, the guidance is not ideal and there is also considerable wear.

In addition, Offenlegungsschrift 2,856,109 discloses a charging table wherein containers for the components to be processed have on the underside a longitudinally directed rack, which cooperates with a pinion on the table in order to longitudinally displace the containers. In this way, the individual containers can be moved longitudinally backwards and forwards in a very confined space and transversely backwards and forwards by other conveying means. However, the conditions applying in connection with this charging table are quite different from those in an assembly system, wherein it is a question of longitudinal conveying with a precise possibility of positioning.

The problem of the invention is to provide an assembly system of the aforementioned type which, in the case of ideal possibility of adaptation to different requirements, permits a simple construction, trouble-free conveying and precise positioning.

According to the invention, this problem is solved in that it comprises a plurality of optionally different system units with in each case at least one independent drive unit drivable in a controlled manner, that the work carriers have longitudinally directed engagement means and the drive units have rotary drive members which positively engage therein, that the work carriers are guided on guides dependent on the drive and that at least one of the drive members has a free-wheel means acting in the conveying direction.

Preferably, the individual units need have no mechanical drive connection with one another and can consequently be successively coupled with simple electrical power transmission and control cables. The work carriers, whose length is preferably greater than half the length of a unit, are conveyed in a precisely controlled manner by the drive members for each individual work carrier and can be stopped at random points with very good positioning and an accuracy of better than 1 mm. For this purpose, it is possible by means of mechanical or non-contacting sensors to control the drive in such a way that on approaching the desired position the drive is firstly geared down from rapid traverse to inching and is then stopped with good positioning accuracy.

The work carriers run on guides, which are independent of the drive and preferably on L-shaped rails, which greatly simplifies construction and ensures that during processing the drive is not influenced by forces exerted on the work piece or on the work carrier, as would be the case with work carriers carried by the drive. The freewheel means, which can be constructed as a directional automatic freewheel or as a loose coupling, ensures in the case of units provided therewith that without precise synchronization of the conveying speeds a frictionless transfer from the drive of one unit to that of the next unit is possible. It is also possible to use a conveying unit provided e.g. between two assembly stations as a short-term storage means. The previous assembly station slides the work carrier onto the conveying unit, whereby it is not impeded by the freewheel means, and the drive is then ready to start, but is only operated when the following assembly station is ready to receive.

Each drive unit can preferably have its own low voltage geared motor and in particular a vehicle windshield wiper motor. These robust, mass-produced electric motors can be used, because the assembly system requires no forced synchronization between the individual units. The use of low voltage, for example 24 volts direct current, permitting the use of truck windshield wiper motors and control relays, also makes installation more reliable and, due to the relatively low input power, also requires no unusual metallic cross-sections.

For obtaining a high degree of positioning accuracy, the drive is preferably positively engaged. The drive members can be pinions and the engagement members racks, arranged on the sides of the work carriers or shaped into the latter. However, it would also be possible to use other positively engaged drive members, e.g. pin wheels engaging in a perforated rail or chain and timing belt-like drives.

Particularly if they are square or almost square, the work carriers can have racks on all four sides enabling the work carriers to be moved, as required and without pivoting into different directions. They preferably run on running means, which are preferably constituted by rollers fitted to the tool carriers. The rollers are arranged in such a way that only those acting in the particular running direction rest on the guide rails, whilst the others permit an unimpeded movement in an e.g. intermediate depression. To ensure a completely satisfactory lateral guidance, preferably rollers are provided having a vertical axis and preferably provided in the four corners of the work carrier, whereby they project somewhat beyond these corners in such a way that they also act in both conveying directions of the work carrier.

Particularly in assembly stations with a more accurate possibility of positioning, the drive members are constituted by two spaced, synchronously driven pinions, so that they can both engage in a rack. One has an actuatable coupling and another a freewheel, thereby ensuring a particularly good and trouble-free transfer of the work carrier from unit to unit.

For a very accurate positioning of approximately 1/100 mm, a drive-independent indexing means is preferably provided for the work carrier. It has an indexing element, e.g. in the form of a rack portion, which can engage in lateral conveying racks of the work carrier.

Such indexing makes it particularly easy to adapt the system to different workpieces, because the indexing spacing is the same as the rack spacing. On arranging a plurality of workpieces on a work carrier or a plurality of processing stops, work carriers can be stopped in precise working positions and several points and optionally also with different step sizes. The position data used for controlling the work carrier can be supplied by a sensor, which preferably counts the teeth of the engagement elements of the work carrier in non-contacting, e.g. inductive manner.

In order to be able to change the conveying direction, corner units can be provided having two pairs of rails which are preferably at a right angle to one another, whereof at least one rail in each case is raisable and lowerable. In conjunction with the work carriers provided on all four sides with racks, the conveying direction of the work carrier can be deflected at right angles without it being necessary to pivot the work carrier. After introducing into the corner station, the rail blocking a move-out and running in the previous conveying direction is lowered and the previously lowered rail for the following conveying direction is raised. Preferably, the corner unit is also usable as a processing station. In order to make the two outsides of the corner station freely accessible, the drive and optionally the indexing can be provided on the insertion and removal sides and is consequently lowerable. The described construction is particularly suitable for approximately square work carriers. In the case of elongated work carriers, pivoting about a vertical axis is appropriate.

To increase the flexibility of the assembly process, buffer units can be provided. They make it possible to disengage the individual assembly stations from one another to such an extent that faults on assembly devices or short pauses on the part of the assemblers are possible without impeding the complete operation. The buffer units can have at least two parallel guideways with drive units, in each case at the entrance and exit of the guideways and a shifting device for the work carriers from the first to the second guideway. To increase the buffer capacity, further parallel guideways could be provided on the entrance or exit side, which shifting devices must always be provided. Thus, the buffer station could be adapted to the in each case necessary storage capacities in the building block system. It is also possible to use such a buffer unit for branching purposes, in that a unit is connected to a branching line at the exit of the first guideway, where it is then optionally linearly conveyed through by a separate drive in the case of a branching instruction.

It is particularly advantageous to use a U-shaped arrangement of the complete assembly system, because then the loading and unloading of the work carriers with the workpieces or blanks on which the assembly is based, can be performed by a single industrial robot, positioned between the loading and unloading station and also transposes the work carriers from the unloading to the loading station. However, it is also possible when using other unloading and loading possibilities to arrange the assembly system in a substantially closed manner or, in the case of a rectilinear arrangement, to return the work carriers parallel to the exit point with other conveying means.

Preferred embodiments of the invention are shown in the drawings and are described hereinafter, wherein in the drawings show.

In the drawings, the same parts carry the same reference numerals, and comparable parts carry the same reference numerals with small letters as indices. If their essential construction and function are the same, the description thereof will not be repeated.

Figure 1:
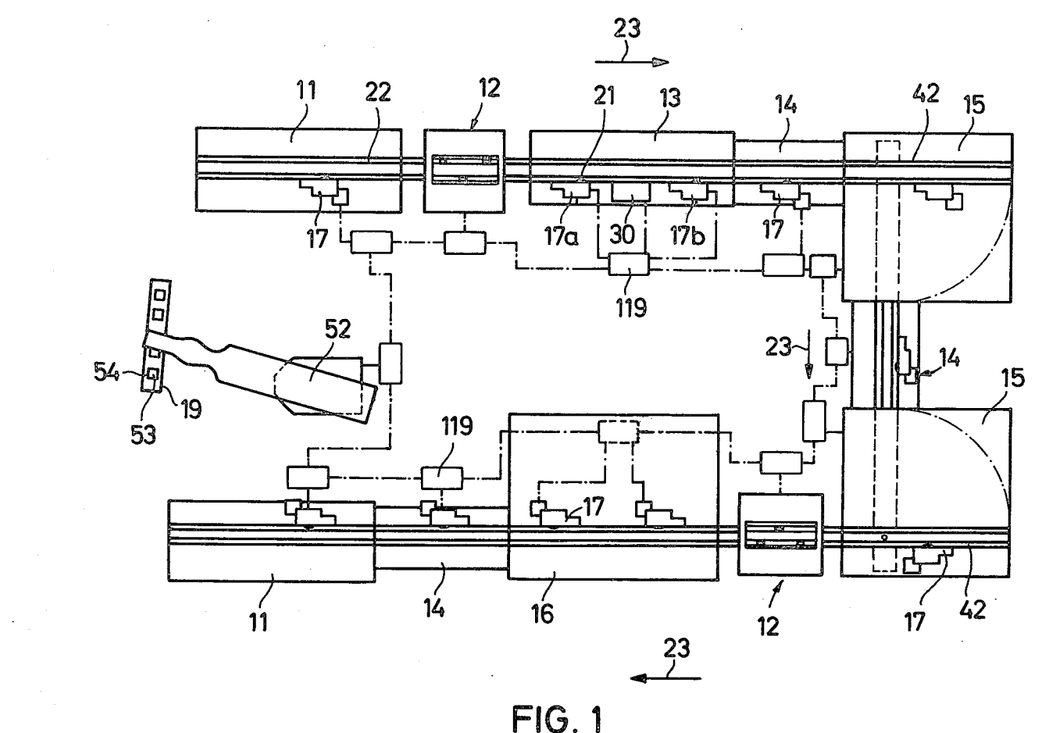
FIG. 1 a diagrammatic plan view of an embodiment of an assembly system.

The system shown in FIG. 1 is used for carrying out working processes, particularly production and/or assembly processes on workpieces 53, whereof in each case a plurality are taken up by means of work supports 54 on a work carrier 19. The complete arrangement of the assembly system is U-shaped, i.e. the loading station 11 at the entrance faces the substantially identically constructed unloading station 11 located at the exit of the assembly line.

A so-called industrial robot 52, i.e. an apparatus which, in program-controlled manner, can perform manual activities, is set up between the loading and unloading units, removes the workpieces 53 from work carrier 19 and places them on the guideway 22 of loading station 11. The robot can also load the work carriers with new workpieces.

By means of a drive 21, the work carrier is conveyed in rectilinear manner by means of a buffer station 12 into an indexing station 13 and by means of a conveying unit 14 into a pivoting unit 15, where it is pivoted by 90° and then conveyed by means of a further conveying unit 14, a further pivoting unit 15 and a further buffer unit 12 into a working station 16 for mainly manual working processes and finally by means of a conveying unit 14 into discharging unit 11.

Figure 2:
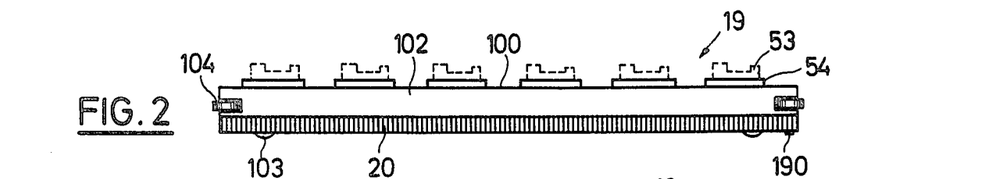
FIG. 2 a side view of a work carrier.
Figure 3:
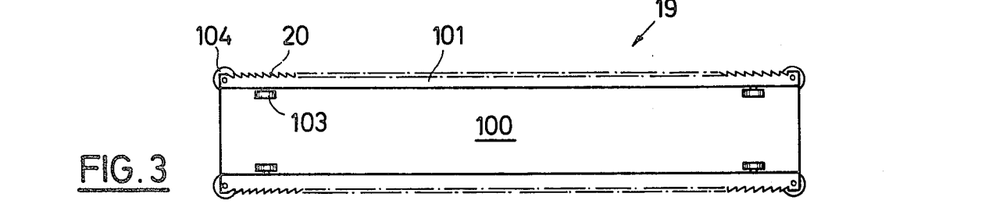
FIG. 3 a bottom view of the work carrier.
Figure 10:
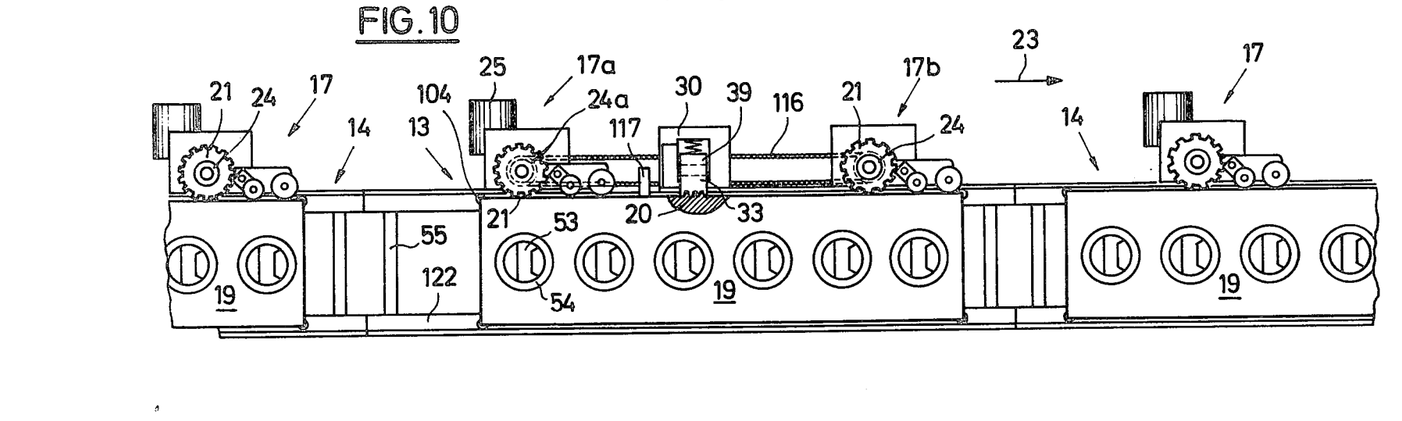
FIG. 10 a plan view of a portion of the system.

FIGS. 2 and 3 show a work carrier 19, having an elongated, rectangular shape and made from a plate-like plastic or cast aluminium base part 100, on whose top surface are arranged optionally a plurality of work supports (shown in FIG. 10 as circular work supports 54). On the underside of base part 100, racks 101 are arranged along the longitudinal edges and their teeth 20 constitute engagement members for the drive. As a function of requirements, these racks can be made from metal or plastic. Normally, they are arranged in such a way that they do not project beyond the lateral portions 102 of the base part forming a contact surface.

On the inside of the racks and at a certain distance from the corners of the workcarrier 19 is in each case provided a roller 103 projecting somewhat beyond the underside of the rack and whose running direction coincides with the longitudinal direction of the work carrier. In the base part, recesses are provided at the four corners of work carrier 19 and in which is in each case positioned a guide roller 104 having a vertical axis in such a way that it longitudinally and transversely projects beyond the outer boundary of the work carrier.

Figure 4:
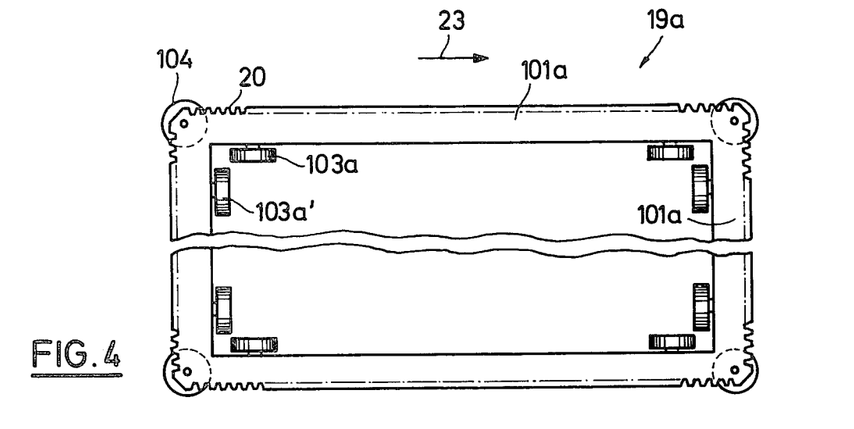
FIG. 4 a bottom view of another work carrier.
Figure 5:
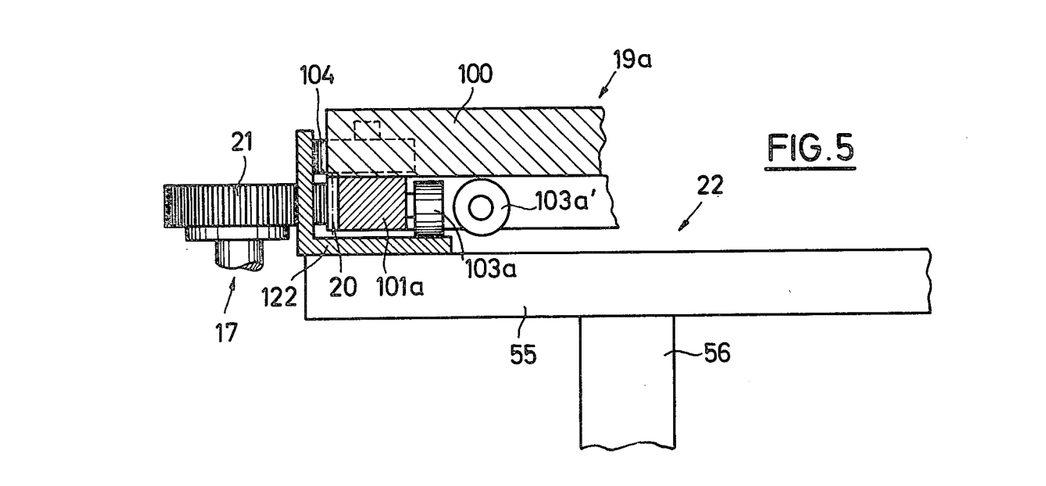
FIG. 5 a detailed section through the work carrier of FIG. 4 and a guide rail.

Although shown in shortened form, the work carrier shown in FIG. 4 is square and unlike that of FIGS. 2 and 3 is provided with racks 101a on all four sides. Thus, in each corner there are two horizontally axed rollers 103a and 103a', one of which belonging in each case to the running directions of the work carrier 19a displaced relative to one another by 90°. FIG. 5 shows that rollers 103a and 103a' are arranged in such a way that the roller (in this case 103a) acting in the corresponding running direction is closer to the lateral edge in the conveying direction 23 (in FIG. 5 perpendicular to the drawing plane) than the other roller 103a. Thus, roller 103a runs on an L-rail 122, without this being impeded by roller 103a'. Guideway 22 comprises two L-shaped rails 122, whose vertical members form a contact surface for the guide rollers 104. A pinion 21 belonging to drive unit 17 passes through a recess in the vertical member of rail 122 into teeth 20.

Whereas the work carrier according to FIGS. 2 and 3 is suitable for elongated workpieces and/or a plurality of longitudinally successively arranged smaller workpieces, the work carrier according to FIG. 4 is suitable both for large, bulky workpieces or joined subassemblies, and for individual workpieces. It offers the possibility of conveying in two directions perpendicular to one another and can therefore be used on a more universal basis in an overall system.

Figure 6:
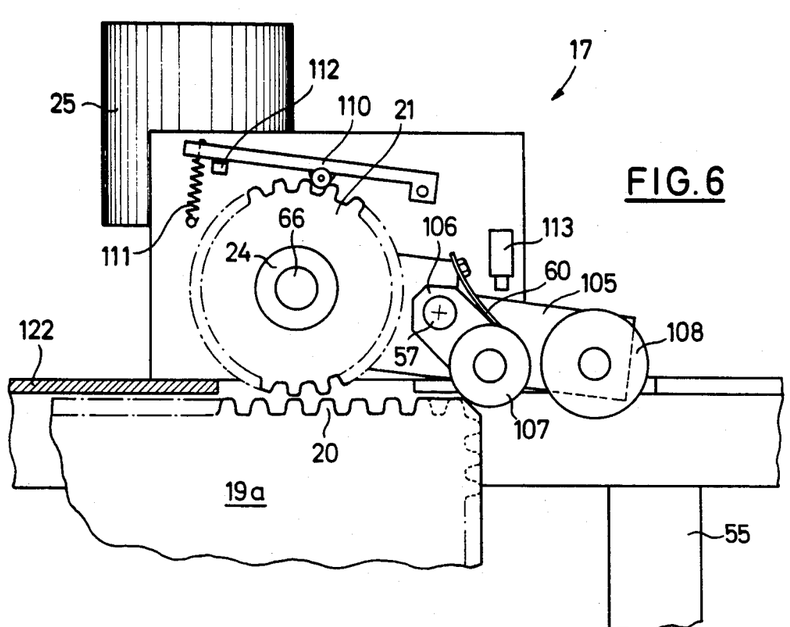
FIGS. 6 and 7 a plan view of a drive unit and a detail of a guideway and work carrier in two working positions in part sectional form corresponding to line VI—VII of FIG. 8.
Figure 7:
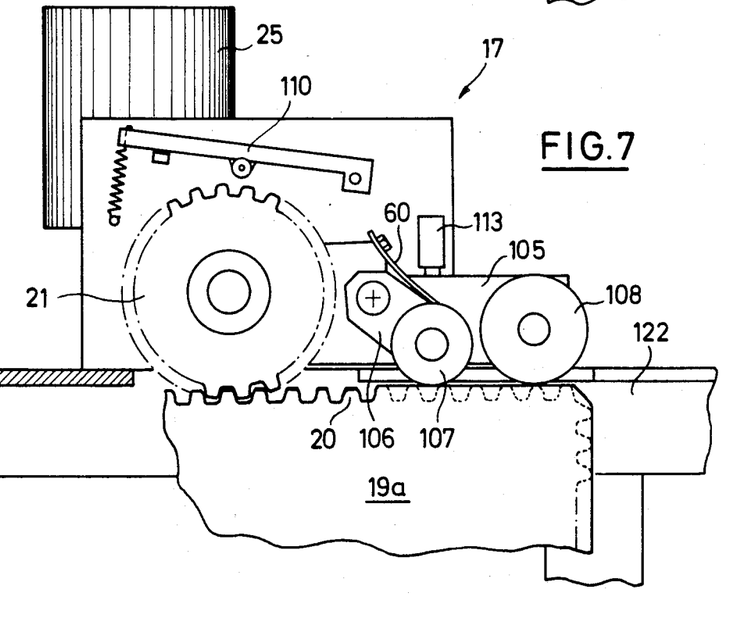
Figure 8:
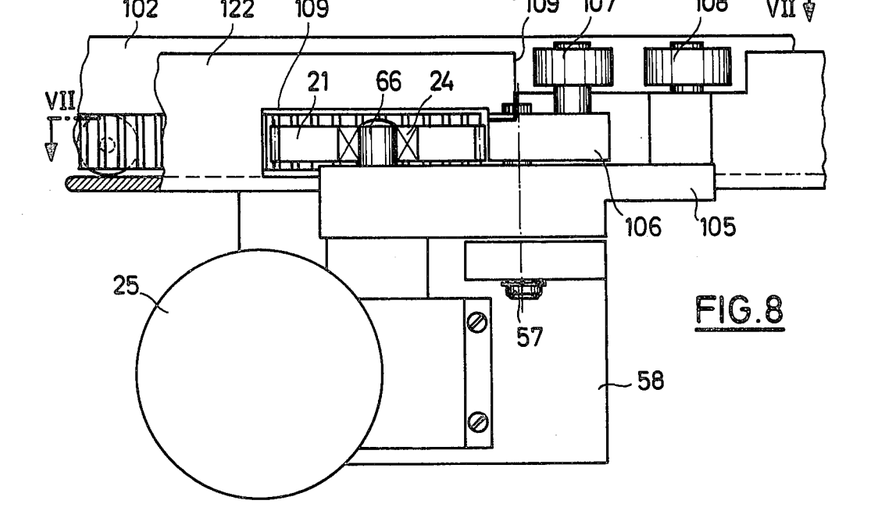
FIG. 8 a side view of a drive unit with details of the guideway and work carrier.

FIGS. 6 to 8 show a drive unit 17 which, together with its drive, can be installed on a guide rail 122 as a compact, preassembled unit. It has a geared motor 25 mounted on a hinged plate 105 and drives the pinion 21 by means of a shaft 66 and an intermediately connected freewheel 24. Hinged plate 105 can be pivoted about a vertical pivot pin 57 provided on a base frame 58 and about which can be pivoted counter to the tension of a leaf spring a one-armed lever 106. At the free end of lever 106 is mounted a prestressing roller 107 and adjacent thereto at the end of hinged plate 105 opposite to pinion 21 is mounted a locking roller 108. Rollers 107, 108 and pinion 21 pass through recesses 109 in guide rail 122. The pinion engages in teeth 20 and the rollers can run on contact surface 102 outside the path of guide rollers 104. Adjacent to the periphery of pinion 21 is provided a brake means 110 having a roller fixed to a pivotable lever and which is loaded by a spring 111 in the direction of pinion 21, but is held in position by a stop 112 in which the brake means only prevents the rotation of pinion 21 in the position in which it does not engage in the teeth 20 of the work carrier.

This position is shown in FIG. 6. The work carrier which has just been moved by another drive unit enters by its leading edge the area of drive unit 17. Leaf spring 60 pivots clockwise lever 106 and hinged plate 105, so that rollers 107, 108 project into the path of work carrier 19a, whilst pinion 21 is pivoted out of engagement. If (FIG. 6) prestressing roller 107 engages with the leading edge of work carrier 19a, it is pivoted back in a counterclockwise direction and thereby exerts a force on hinged plate 105 which forces pinion 21 in the direction of the rack. If the teeth immediately mesh, the drive connection is already formed. If, however, in the manner shown in FIG. 6, tooth meets tooth, then prestressing persists until engagement takes place. The braking of pinion 21 by brake means 110 ensures that there is a relative movement between the teeth and they cannot roll tip to tip on one another. This engagement is reliably produced during the movement of the work carrier leading edge between rollers 107 and 108. By means of prestressing roller 107, locking roller 108 converts the non-positive engagement into a positive engagement in which the engaging teeth are precisely positioned relative to one another. In this position, a switch 113 is operated, which gives the on-signal or on-release for motor 25. Brake means 110 then no longer engages in pinion 21.

Figure 9:
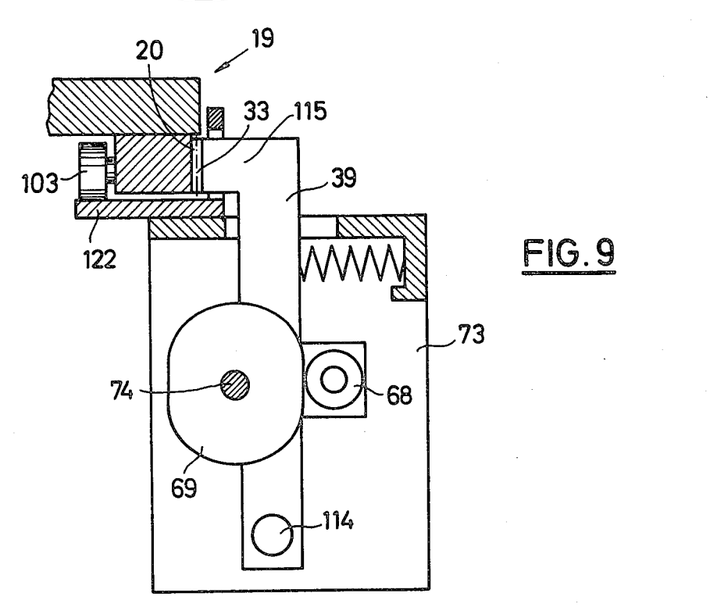
FIG. 9 a cross-section through an indexing unit.

FIG. 9 shows an indexing means 30, whose frame 73 is also fixed in a guide rail 122 and carries the pivot pin 114 of an indexing lever 39 which, at its upper free end, has a projection 115 with a rack piece 33 which can engage with the teeth 20 of work carrier 19 on pivoting lever 39. Instead of using a rack piece with a plurality of teeth, it could also be possible to use a single tooth, a ledge or a similar indexing member.

Indexing lever 39 is controlled by a disk cam 69, to whose spindle 74 is connected a not shown geared motor, which is drivable in quarter-rotation steps. On disk cam 69 runs a driving roller 68, which can force back indexing lever 39 out of engagement with teeth 20 and counter to the tension of a spring. Thus, indexing takes place in a non-positively engaging manner under the action of the spring.

FIG. 10 shows a portion of the assembly system, comprising an indexing station 30 and two conveying units 14 or, with respect to the drive, identically constructed work stations for manual work. Each of the conveying units 14 has a drive unit 17, whilst the indexing station 13 has a double drive unit, comprising drive unit 17a which is connected to a drive unit 17b by means of a chain 116, a toothed belt or the like. In place of freewheel 24 (FIG. 8), drive unit 17a has an actuatable clutch 24a, indicated by the dash lines and drive unit 17b is driven from unit 17a by chain 116 only, instead of by motor 25.

An indexing unit 30 is fitted to the same guide rail 122 centrally between drive units 17a, 17b.

Each unit or station 11 to 16 comprises in each case two parallel guide rails 122, transverse beams 55 connecting the latter and supports 56 carrying the latter (FIG. 5). The individual units have separate drives and no mechanical drive parts extending from one unit or station to the other. Thus, they can be placed behind one another in the manner of tables or benches and are only interconnected by electrical lines. Thus, they can be particularly easily adapted to and reequipped for different circumstances. Conveying of work carriers 19 between the individual stations will be explained relative to FIG. 10. Each station 14 only has one drive unit 17, whilst the indexing station 13 has a double drive 17a, b. Work carriers 19 are long enough to extend from one pinion 21 to the other. However, it can also be advantageous to provide a double drive 17a, 17b, even if the arrangement of a single drive would suffice on the basis of the work carrier length.

If, for example, the work carrier 19 shown centrally in FIG. 10 is to be conveyed away in conveying direction 23, drive 17 of the right-hand conveying unit and drive 17a, 17b are put into operation. However, clutch 24a is not operated, so that motor 25 only effectively drives drive unit 17b. Indexing lever 39 was pivoted back beforehand and the indexing member (rack piece 33) was disengaged. Therefore, the right-hand and central work carriers are displaced in the conveying direction. When the central work carrier has reached the right-hand drive 17, it is taken up by the latter, following engagement in the manner described in connection with FIGS. 6 and 7. A possibly different drive speed of the now engaged pinions 21 resulting from the independent drive is compensated in that one of the freewheels of units 17 or 17b responds, as a function of which of the two conveying speeds is higher. In the case of a slower drive, the pinion "overtakes" its drive shaft.

Simultaneously, the left-hand drive unit 17 could be switched on and the left-hand work carrier 19 is transferred by conveying unit 14 to indexing unit 13 and enters unit 17a, whilst still being moved by the left-hand drive unit 17. Following the engagement of the pinion, limit switch 113 (FIGS. 6 and 7) indicates the readiness to operate and clutch 24a is closed, so that now drive 17a takes over the work carrier. Advantageously, clutch 24a is constructed as a friction clutch, which optionally also acts as a safety or slip clutch. Thus, in the case of a higher drive speed of the left-hand drive unit 17, pinion 21 of drive unit 17a can compensate this overspeed.

At indexing station 13, for example, it is possible to provide an automatic assembly or processing machine, which successively performs processing or assembly operations on the six workpieces on the work carrier. For this purpose, the work carrier is precisely positioned or indexed in the six successive positions. Therefore, work carrier 19 is firstly brought into a position relatively accurately corresponding to the desired position by controlled disconnection of the drive units. Advantageously, the control signal device for the work carrier position is constituted by a non-contacting, e.g. inductive or capacitive sensor 117, which cooperates with teeth 20 and counts the number of teeth moving past it from the start of the work carrier. As a result of this precise digital path measurement, a precise and easily adjustable and programmable position can be started. The indexing unit is then actuated by operating the motor rotating shaft 14 (FIG. 6) and rack piece 33 engages in teeth 20. Through the use of a rack for indexing purposes, not only a very accurate, but also a very adaptable indexing is obtained. The spacing is only predetermined by the pitch, which permits a very considerable freedom in the selection of the position. After processing is completed, indexing lever 39 is pivoted back again and the drive conveys the work carrier forwards by one workpiece spacing or a fraction thereof if a plurality of successive operations are to be performed on one workpiece. Even in the case of considerable workpiece weights, the work carrier runs easily and in frictionless manner due to its roller guide. The rollers running in ball bearings used as running and guide rollers not only run easily and can take up considerable forces, but also ensure a very accurate guidance. It has been found that a position accurate to 1/100 mm is possible, if the indexing unit 30 applies the work carrier via guide rollers 104 onto the facing guide rail. However, a prerequisite for this is a precisely aligned and machined guide rail. Optionally, a very precisely machined guide strip can be provided in the rail made from conventional profiled material. In the case of very high forces, dimensions or weights, it is possible to provide additional running and guide rollers in the central area of the sides. It is also possible to use other running members as rollers. Thus, for example, in the case of a relatively small weight of the work carriers, balls can be used, which have the advantage that they act in both running directions, so that in the case of a work carrier 19a (FIGS. 4 and 5) a single running ball can be provided in the corner area in place of the two rollers.

Figure 11:
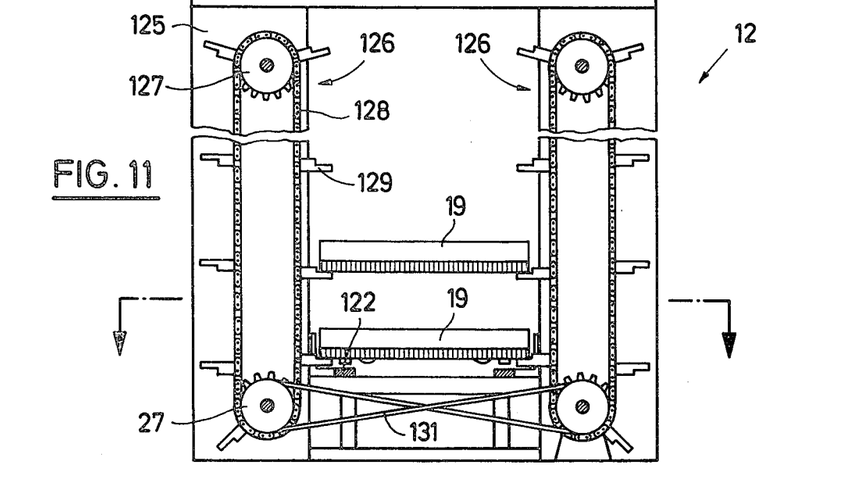
FIG. 11 a part sectional view along line XI—XI of FIG. 12 of a buffer unit.
Figure 12:
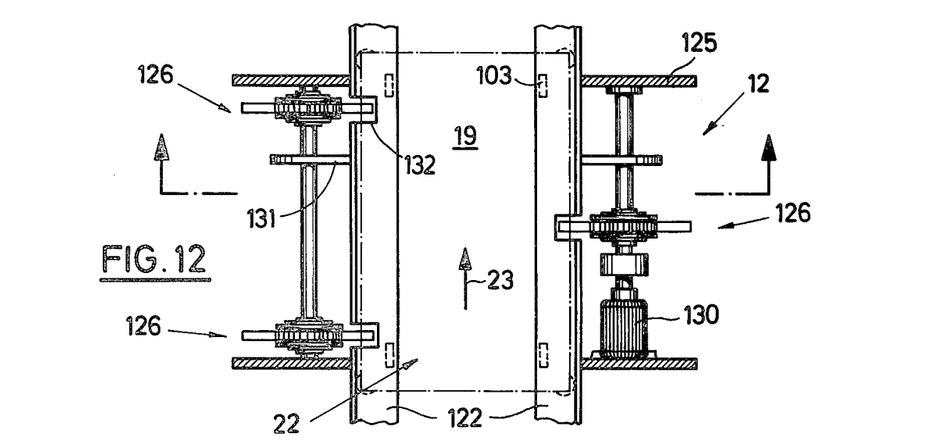
FIG. 12 a section along line XII—XII of FIG. 11.

FIGS. 11 and 12 show a buffer station 12, which serves as an intermediate store for work carriers during the production or assembly sequence. It comprises a conveyor-type elevator, which raises the individual work carriers from the guide rails 122 and carries them in a random number in superimposed manner. It is formed by a feed-through store, i.e. the work carrier passes through it if no intermediate storage is required.

Buffer station 12 has a frame 125, shown in broken-away form in FIG. 11, on which are provided three chain conveyors 126, whereby two are spaced from one another on one side of guideway 2 and the other is placed centrally between these on the opposite side. Each chain conveyor 126 comprises two spaced, superimposed sprockets 127 and a chain 128 connecting the latter and which carries spaced support fingers 129. All three chain conveyors 126 are driven synchronously by a motor 130, in that the shafts of the lower sprockets 127 are interconnected by a chain or a toothed belt 131. The support fingers 129 project through recesses 132 in the guide or running rails 122, which project inwards from the outer edge until the running surface for the rollers of work carrier 19 extends in an uninterrupted manner. As a result of the longitudinal displacement of the recesses, the lateral guidance of the work carrier is substantially maintained during its passage.

For storage purposes, the work carrier is stopped in the station by a drive (not shown) of the previously described type. The chain conveyors 126 are operated by motor 130 in such a way that the inwardly projecting support fingers 129 move upwards. The support fingers passing through recesses 132 raise the work carriers 19 and convey them upwards. When the following support fingers 129 are somewhat below support rail 122, the storage means is stopped and is either moved upwards for storing the next work carrier or downwards for the reintroduction of a work carrier into guideway 22. If a very precise guidance and control of the support fingers is possible, they could also be constructed in such a way that they substantially fill the recesses 132, including the cutout in the vertical members of the L-shaped guide rail and consequently take over the guidance of the passing work carriers. In this case, there would also be no need for the reciprocal displacement of the conveyors. A random number of chain conveyors 126 can be used as a function of this and of the size of the work carriers. The chain can be replaced by a toothed belt or a similarly acting lifting device, e.g. a threaded spindle.

Figure 13:
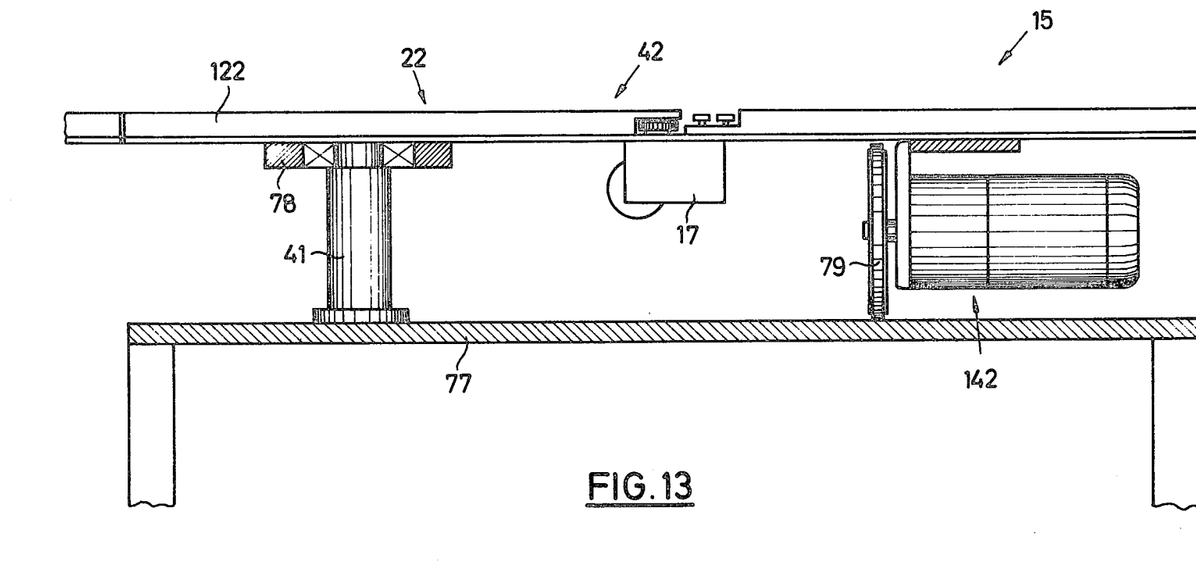
FIG. 13 a part section through a pivoting unit.

The pivoting unit 14 shown in FIGS. 1 and 13 comprises a table-like frame with a horizontal and substantially square plate 77, to which is fitted a vertical spindle 41. At the upper end thereof is mounted a pivoting member 42, which comprises guide rails 122 interconnected by transfer spars 78. A drive unit 17 is arranged on one guide rail. In the represented embodiment, the mounting takes place in eccentric manner, but can also take place in a central manner.

A pivot drive 142 comprises a geared motor, which drives a relatively large friction wheel 79, whose axle runs parallel to the longitudinal extension of guide 22 and below the latter. Pivoting member 42 is mounted on the axle, e.g. by a ball bearing with a certain clearance in such a way that the friction wheel 79, under the weight of the pivoting member and the drive, rests on the surface of plate 77 and on operating the reversible geared motor pivots the pivoting member in the desired direction. The work carrier leaves the pivoting member in the same direction in which it was applied, so that drive unit 17 need not be reversible.

Figure 14:
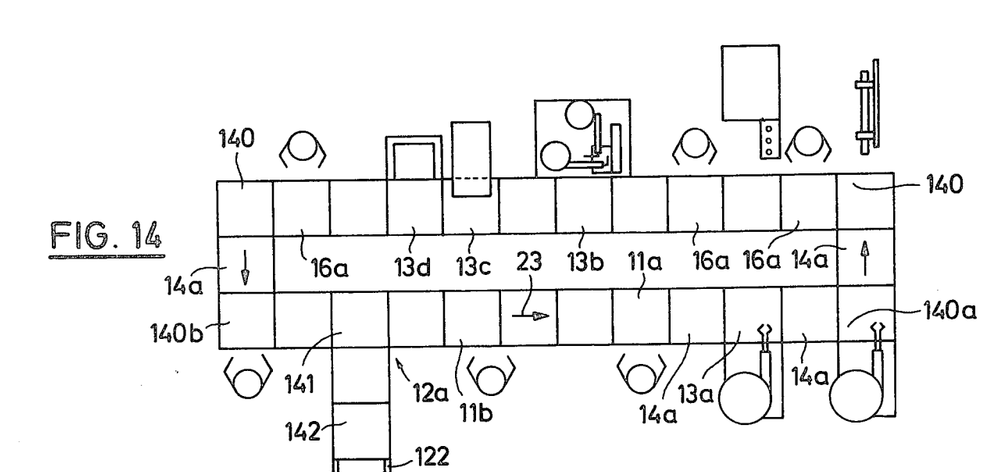
FIG. 14 a diagrammatic plan view of a further embodiment of an assembly system.

FIG. 14 shows a system, which can work e.g. with square work carriers according to FIG. 4. It forms a closed arrangement in the form of an elongated rectangle in which the work carriers run round in a circular manner. In the represented embodiment, machining or processing starts at the manual working station 11a, where the first part is manually placed on the empty work carrier. In a following station 13 in the conveying direction 23, the work carrier is indexed or positioned and a further part is added or applied by means of an automatic supply arrangement. The same takes place in the following corner unit 140 (in each case by means of an intermediate conveying station 14a), in which the work carrier is transversely conveyed away at right angles. This corner unit will be described with reference to FIG. 15. It can simultaneously be used as an automatic working station 140a or a manual working station 140b.

Once again, by means of an intermediately connected conveying station 14a and a corner unit 140 the second longitudinal side of the sytem is connected and starts with two manual workplaces 16a and then three automatic work stations 13b, c, d. A manual work station 16a passes over to a further corner unit, from where the corner/work station 140b is charged or loaded by means of a conveying unit 14a. A buffer unit 12a passes over to the removal station 11b, where the completely assembled workpieces are removed from the work carrier. The buffer unit 12a comprises a corner unit, corresponding to corner unit 140 of FIG. 15, in which additionally one of the outsides has a lowerable guide rail, so that a T-connection 141 is formed, whose free connection leads into a storage zone 142, which has guide rails 112, which are inclined upwards at a small angle and whose length is adapted to the number of work carriers to be stored. Only the first unit of this storage zone requires a drive, by means of which the work carriers are introduced into the storage zone or conveyed out of it again. The remaining work carriers are fed in counter to their own weight and return again under their own weight, because the zone slopes upwards.

Such a T-connection could also be used for branches, e.g. for separating out faulty workpieces for reprocessing or remachining. Such a store can be particularly easily arranged in a corner or, for example, in place of one of the conveying units 14a, on the short sides of the rectangle, so that the space within the rectangle could then be used as a storage zone. This would also permit a return of faulty workpieces for reassembly or the like. For rapid conveying, where precise positioning is not vital, it would be possible to use a drive unit having a friction wheel in place of pinion 21. The other construction could be similar to that of FIGS. 6 to 8. The spring-mounted roller 107 is particularly advantageous, because it can be used to ensure the pressing of the friction wheel. The freewheel can be eliminated, if it can be ensured that the friction wheel can function with a certain slip. This arrangement permits a rapid conveying, e.g. the return conveying of work carriers.

Figure 15:
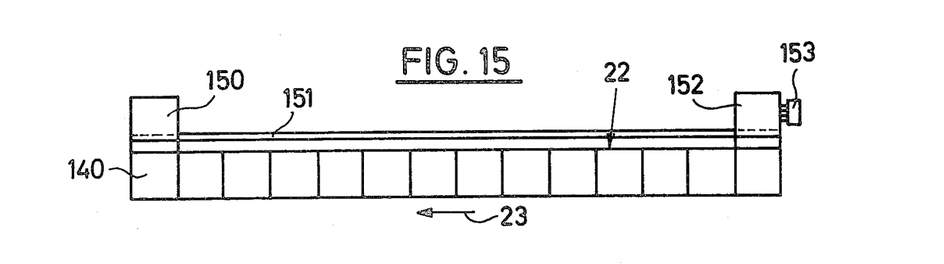
FIG. 15 a diagrammatic plan view of an assembly system with a return path for the work carriers.

In a system essentially involving a rectilinear assembly or production line, return conveying could take place in the manner diagrammatically indicated in FIG. 15. At the end of the assembly taking place in conveying direction 23, there is a corner unit 140, which conveys the work carriers into a tipping or tilting unit 150. In the latter, a guideway portion is tiltably mounted in the manner to be described hereinafter relative to FIG. 16, but downwardly about an axis pointing towards corner unit 140. The work carrier is tilted with its otherwise horizontal plane into the vertical and then can pass in vertically standing manner under its own gravity or by friction wheel drive, in the manner described hereinbefore, along a return conveying zone 151 on the back of the assembly units to the start of the zone, without requiring additional space. This is particularly advantageous with very wide work carriers, whose return conveying zone would otherwise require a large amount of space.

At the end of the return conveying zone, there is a tilting/lifting unit 152, constructed in accordance with station 150 and which again tilts the work carrier into the horizontal. It is also equipped with a lifting mechanism 153, which works with a threaded spindle or the like and raises the work carrier to the level of guideway 22, if it is to be conveyed by gravity.

Figure 16:
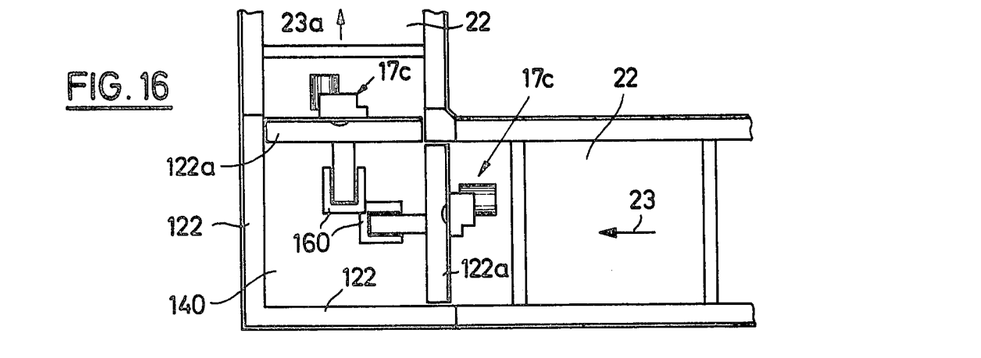
FIG. 16 a plan view of a corner unit.

Corner unit 140 is shown in FIG. 16. It is for a square work carrier with a suitable square unit having fixed guide rails 122 on two abuting sides, which meet in the outer corner. The guide rails on the two other sides, to which are connected the two guideways 22 of the system which are at right angles to one another, comprise guide rail portions 122a, which can be lowered by means of a tilting mechanism 160. In the represented embodiment, the guide rail portions 122a also carry the associated drive units 17c, so that the two outer corners of the corner unit are freely accessible and the corner unit can be used as a work unit. The drive unit 17c can be the same as drive unit 17, but there is no need for a pressure action by means of rollers 107, 108 and for this purpose a mechanism is provided which engages the pinions after the upward pivoting of the guide rail portions 122a. This can also be brought about by a corresponding pivoting movement of the guide rail portions.

A work carrier running into the corner unit in conveying direction 23a passes over the then lowered guide rail portion 122a, which is at right angles to the conveying direction. This guide rail portion 122a is then pivoted upwards and the other guide rail portion 122a pivoted downwards, so that the work carrier can now be extended, displaced by 90°.

Figure 17:
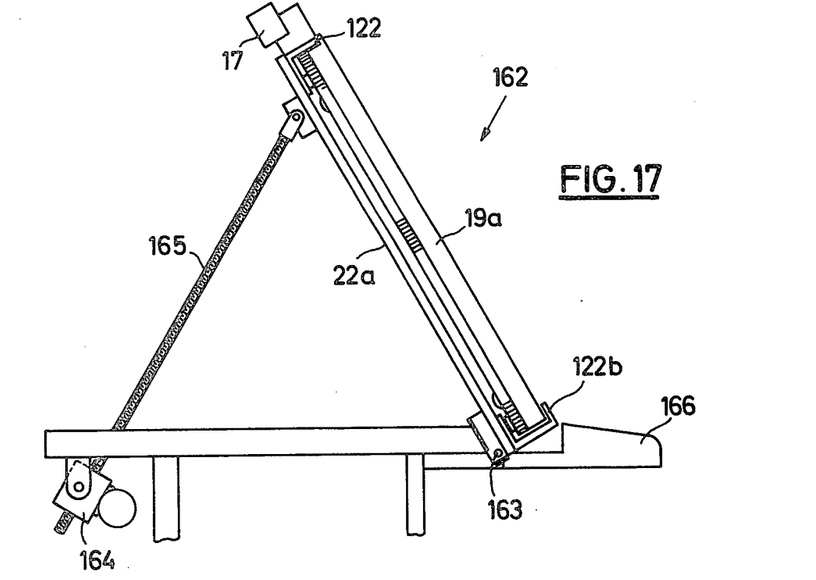
FIG. 17 a side view of a tipping unit.

FIG. 17 shows a tilting unit 162 serving to bring the work carriers into an inclined position. For this purpose, guideway 22 of the said unit is pivotably mounted about a spindle 163 and the side opposite to the latter can be raised and lowered by means of a lifting mechanism 164, which works e.g. with a lifting threaded spindle 165. If, in the represented manner, tilting takes place about a considerable angle, it is then advantageous to construct at least the lower area of the corresponding guide rails 122b as U-rails to prevent the work carriers slipping out. Advantageously, a hand rest 166 follows onto each of the units used for machining purposes.

The tilting unit is provided in order to bring large work carriers, on which assembly operations have to be carried out at different points, into an ergonomically favourable position for the assembler. This can take place in an individual work station, but advantageously in the case of such work carriers a complete assembly line is correspondingly inclined and a tilting station 162 is provided at the beginning and end of the line. It can also be combined with a corner station.

Figure 18:
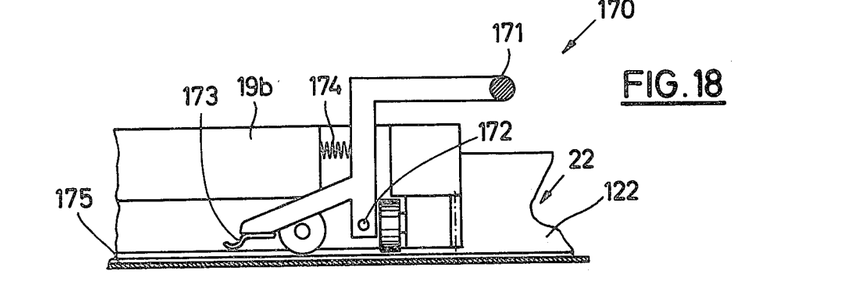
FIG. 18 a part sectional detail of a work carrier.

FIG. 18 shows a contact device, which can be provided at the front of a work carrier and prevents the operator from jamming his hand between two successive work carriers. This is advisable in certain circumstances because in the system according to the invention, the work carriers are not conveyed at fixed intervals and instead conveying is made very flexible. Thus, for example, with the arrangement according to FIG. 10, the next work carrier can be entering before the first work carrier has left the corresponding station. Therefore, intermediately connected conveying stations in each case act as a buffer station for the workpieces.

Contact device 170 comprises a member 171, which is pivotably mounted about a horizontal spindle 172 in the manner of a multiply bent, double-armed lever. Its part which projects somewhat above the work carrier 18b via its leading edge forms a rod for the work carrier width, whilst at its other end a contact spring 173 is provided which, if the lever is pivoted back counter to the tension of a spring 174 by contact with member 171, contacts a contact rail 175 between the guide rails so that a low voltage signal is emitted which, via the control means, immediately stops the drive. This arrangement with a contact rail has the advantage that it also responds if e.g. a tool drops into the guideway.

Figure 19:
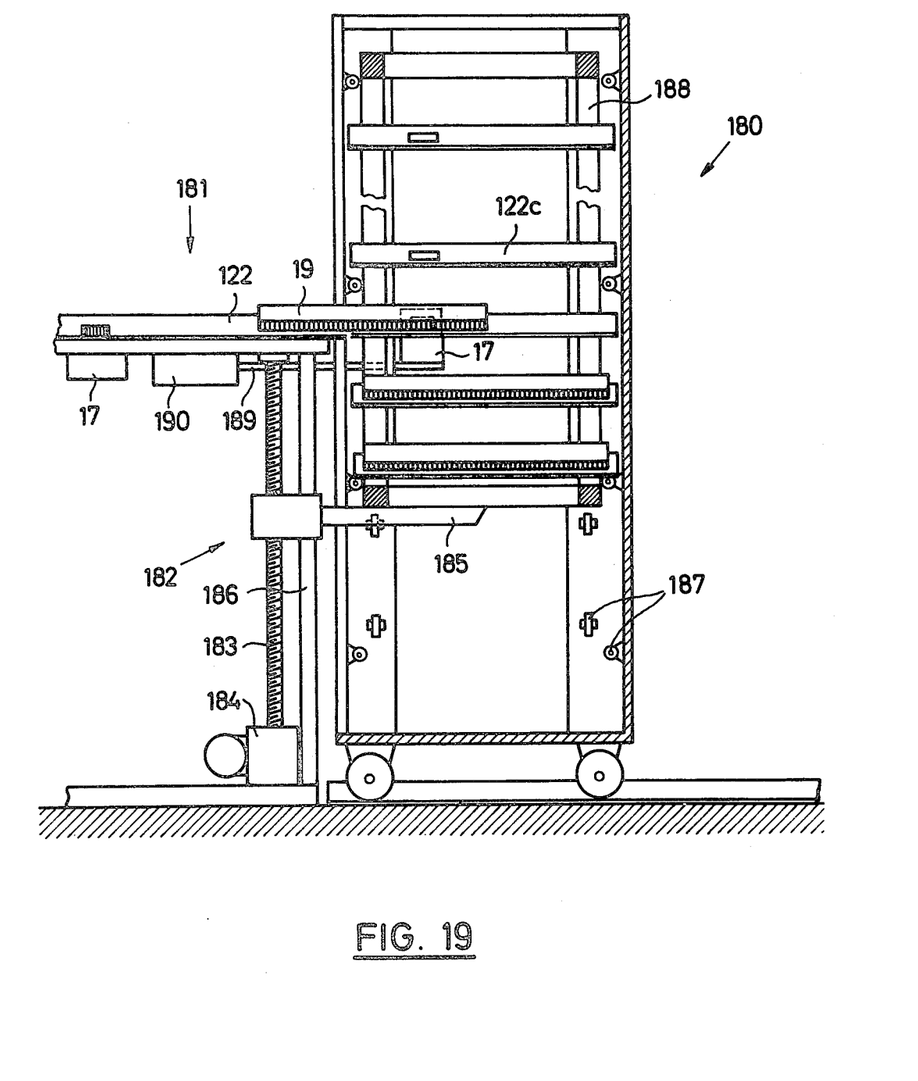
FIG. 19 a part sectional side view of a work carrier magazine.

FIG. 19 shows a conveyable magazine 180, which belongs to the production and assembly system and can be connected to a storage station 181. It serves to automatically receive a plurality of work carriers, so that they can be conveyed either for intermediate storage or for transfer to another similar system, independently of the particular assembly zone. As a result, different assembly systems can be interconnected.

The storage station 181 comprises a normal conveying station with free-terminating guide rails 122, which have a drive 17 and additionally a lifting mechanism 182 having e.g. a vertically mounted threaded spindle 183 which can be rotated by a geared motor unit 184 on which is provided a lifting arm 185 driven by a movement nut, which is also mounted on a guide post 186 so that it will not rotate.

The magazine 180 comprises a movable frame, on which are arranged guide rollers 187, which vertically move an inner frame 188, on which are arranged superimposed horizontal guide rail portions 122c in such a way that it is possible to receive between them a work carrier (optionally several such carriers in succession in the case of shorter carriers). Frame 188 can be vertically moved between positions by means of lifting arm 185 and in these positions in each case a guide rail portion 122c is aligned with the guide rails 122 of storage unit 181. By means of a pivotable drive 17 on a lever arm 189 of a pivoting unit 190, a work carrier 19 can be introduced into the particular "compartment" of the magazine. After lowering lifting arm 185 into its lowermost position, magazine 180 which is provided with wheels and guided in a U-rail, is drawn out to the right in FIG. 18 and can then be moved at random.

The invention makes it possible to very accurately position work carriers with individual or numerous workpieces and having random configurations between elongated and square, without hard stops being required. As a result of stepwise or stepless acceleration and deceleration, a further improvement to vibration-free conveying is possible. The control is mainly purely electrical, so that it can take place by means of electronic, programmable components, which simplify the setting up and conversion of the installation to modified workpieces. The fact that the individual units do not have to be interconnected by means of mechanical drive parts and no essential synchronization measures are required between the individual units, facilitates the manufacture and setting up of the system on the building block principle. It is particularly simple to carry out branching off operations, i.e. separating certain work carriers and subject them to special processes or return the same. In this connection, it can be advantageous to provide settable coding elements 190 on the work carrier, in the manner indicated in FIG. 2. These can be conventional insertable and extendable pins or pins which can be tilted in a lever-like manner, which in each case represent one bit in a piece of information and can be set, sensed and reset during the passage of the work carrier.

It is particularly advantageous for magazine 180 to be usable as a store which can be incorporated into the system, if the rear wall is left open and a more extensive guideway can be connected.

The system is controlled in a non-central manner by means of preferably electronic control devices 119 associated with each individual system unit 11 to 16 (FIG. 1) and which as a function of test signals, manual inputs and/or actuations and programs, as well as data received from the upstream or downstream unit control the particular unit and optionally the machines arranged thereon and by means of purely electrical connections supply the necessary signals to the following units. Thus, the system can operate independently of a central control system, is less susceptible to faults and can be reequipped without any action having to take place in the control system. The signal connection between the individual units can be by means of a standardized interface for all the corresponding systems.

I claim:

1. A system for conveying work pieces along a conveying direction, comprising:
   work carriers for supporting the workpieces, the work carriers having engagement members running at least in the conveying direction;
   a plurality of system units having guideways for the work carriers extending in the conveying direction, the system units with their guideways being aligned one after another for sequentially receiving the work carriers, each of the system units having at least one independently drivable and controllable drive unit with a rotary drive means movably driving the work carriers on the guideways and with respect to the guideways, the drive means and engagement members being constructed for reciprocal positive engagement;
   indexing means on at least one of the system units, the indexing means positively engaging the engagement members for accurately positioning the work carriers in at least one predetermined indexing position along the conveying direction, the indexing means urging the work carriers against at least one of the guideways and accurately positioning the work carriers with respect to the guideways, transverse to the conveying direction.

2. System according to claim 1, wherein each of the system units has at least one electric geared motor operating at least one drive unit thereupon.

3. System according to claim 1, wherein the guideways have horizontal and lateral guide faces.

4. System according to claim 1, wherein the work carriers are provided with roller means and the guideways comprise laterally arranged rails, the rails cooperating with the roller means on the work carriers.

5. System according to claim 4, wherein the carriers have lateral sides along which the carriers are conveyed and, the roller means are rollers arranged adjacent the lateral sides, a plurality of the rollers having substantially vertical axes and being arranged in corner areas between the sides, and an additional plurality of the rollers having horizontal axes arranged such that only rollers acting in the conveying direction are positioned to engage the guideways.

6. System according to claim 4, which also comprises a corner unit, two pairs of rails which are preferably at a right angle to one another and raising and lowering means for in each case at least one rail.

7. System according to claim 1, wherein the drive means are pinions and the engagement members are racks provided on an edge of at least one lateral side of the work carrier.

8. System according to claim 7, wherein the engagement members are provided on four lateral sides of the work carriers.

9. System according to claim 7 also comprising counting means cooperating with the racks and which cooperate with a control and positioning means.

10. System according to claim 1, wherein the indexing means for the work carriers is independent of the drive means.

11. System according to claim 10, wherein the indexing means are laterally movable in the guideway, have the form of one or more teeth and press the work carrier against lateral guides.

12. System according to claim 1, further comprising a pivoting unit with a drive unit and a pivoting member which surrounds one of the guideways for pivoting the work carriers, the pivoting member being pivotally mounted about a substantially vertical axis.

13. System according to claim 12, comprising a pivoting drive for the pivoting member having a friction wheel drive fitted to the pivoting member and the wheel pivoting member is movably mounted on a spindle in a direction defined by its longitudinal extension.

14. System according to claim 1, which also comprises storage means with an upwardly inclined guideway.

15. System according to claim 1, which also comprises storage means with conveyor-type elevating means for the superimposed intermediate storage of a plurality of work carriers, the elevating means comprising support fingers engaging through cutouts in the guideway.

16. System according to claim 15, wherein the support fingers are displaced relative to one another in the conveying direction on the facing sides of the guideway.

17. System according to claim 1, wherein it also comprises a first tilting unit in which the work carriers can be tilted from a horizontal plane into an inclined position or into the vertical or vice versa, with tilting drive means enabling the guideway to move a horizontal position and the tilting position.

18. System according to claim 1, characterized by return path means comprising a tilting unit for tilting the work carrier into the vertical position and guide rails for the vertically aligned work carriers.

19. System according to claim 18, wherein the guideway is inclined relative to the horizontal and has means for raising and tilting, as well as for reapplying the work carrier to the guideway.

20. System according to claim 1, further comprising a conveyable magazine with a plurality of superimposed guideways for work carriers, the magazine to be charged with work carriers from a storage station and raisable and lowerable by lifting means, horizontal drive of the work carriers with respect to the magazine being performed by a drive unit arranged at the storage station and introducable into the magazine.

21. System according to claim 1, wherein the individual system units are interconnectable without a mechanical drive connection.

22. System according to claim 1, wherein two drive units driven by a single motor are provided in longitudinally spaced manner on a system unit, and one of the drive units has an actuatable clutch and the other drive unit has a freewheel acting in the conveying direction.

23. System according to claim 1, wherein contact means are provided on the work carrier and are operable by objects located in the path of the work carrier for the disconnection of a drive unit.

24. System according to claim 23, wherein the contact means cooperate with a contact path running along the guideway.

25. System according to claim 1, wherein the work carriers have settable coding means.

26. A system according to claim 1, wherein the drive unit has a freewheel means acting at least in the conveying direction.

27. An apparatus for conveying workpieces along a conveying direction, comprising:
work carriers for supporting the workpieces, the work carriers having engagement members running in the conveying direction;
a plurality of system units having guideways extending in the conveying direction for guiding the work carriers, the system units with their guideways being aligned one after another for sequentially receiving the work carriers, each of the system units having at least one independently drivable and controllable drive unit with a rotary drive means and a freewheel means acting at least in the conveying direction, the work carriers being movably driven on the guideways with respect thereto, the drive means and the engagement members being constructed for reciprocal positive engagement, the drive means being pivotably mounted substantially at right angles to the conveying direction and comprising pretensioning means cooperating with the work carriers for the resilient pressing of the drive means, and locking means arranged behind the pretensioning means and cooperating with the work carrier and fixing the engagement position of the work carrier.

28. System according to claim 27, wherein with the drive means is associated a brake means acting in its non-engagement position to prevent rotation of the drive member.

* * * * *